US012706047B2

(12) United States Patent
Lai et al.

(10) Patent No.: US 12,706,047 B2
(45) Date of Patent: Aug. 11, 2026

(54) DRIVING METHOD OF PIXEL CIRCUIT

(71) Applicant: AUO Corporation, Hsinchu City (TW)

(72) Inventors: Po-Cheng Lai, Hsinchu City (TW); Ming-Ci Siao, Hsinchu City (TW); Wei-Ting Wu, Hsinchu City (TW); Wei-Jen Chen, Hsinchu City (TW); Hung-Chi Chen, Hsinchu City (TW); Po-Chun Lai, Hsinchu City (TW); Yi-Yo Dai, Hsinchu City (TW); Li-Wei Shih, Hsinchu City (TW)

(73) Assignee: AUO Corporation, Hsinchu City (TW)

( * ) Notice: Subject to any disclaimer, the term of this patent is extended or adjusted under 35 U.S.C. 154(b) by 0 days.

(21) Appl. No.: 19/206,120

(22) Filed: May 13, 2025

(65) Prior Publication Data

US 2025/0349254 A1 Nov. 13, 2025

(30) Foreign Application Priority Data

May 13, 2024 (TW) ................................ 113117640

(51) Int. Cl.
*G09G 5/00* (2006.01)
*G09G 3/3233* (2016.01)

(52) U.S. Cl.
CPC ... *G09G 3/3233* (2013.01); *G09G 2320/0247* (2013.01); *G09G 2320/064* (2013.01)

(58) Field of Classification Search
CPC ... G09G 5/005; G09G 2360/145; G06T 11/00
See application file for complete search history.

(56) References Cited

U.S. PATENT DOCUMENTS 10,964,245 B2 3/2021 Lai et al.
2002/0105279 A1 * 8/2002 Kimura ............... G09G 3/3275 315/169.3

(Continued)

FOREIGN PATENT DOCUMENTS

CN 113380193 A 9/2021
CN 115731877 A 3/2023

(Continued)

OTHER PUBLICATIONS

U.S. Appl. No. 18/931,411, Display Panel, Oct. 30, 2024.

*Primary Examiner* — Pegeman Karimi
(74) *Attorney, Agent, or Firm* — WPAT, PC

(57) ABSTRACT

A driving method of a pixel circuit includes: providing a preset light-emission control signal to the pixel circuit, in which the pixel circuit includes a light-emitting element; measuring the light-emitting element while the light-emitting element emits light according to the preset light-emission control signal, thereby obtaining an initial instantaneous brightness waveform of the light-emitting element; and modulating the number of plural pulse signals included in each display frame of the preset light-emission control signal and the pulse width of each of the pulse signals according to the initial instantaneous brightness waveform, thereby generating a compensated light-emission control signal; and providing the compensated light-emission control signal to the pixel circuit. In response to the light-emitting element emitting light according to the compensated light-emission control signal, an instantaneous brightness waveform of the light-emitting element appears to converge in each display frame.

14 Claims, 8 Drawing Sheets

(56) References Cited

U.S. PATENT DOCUMENTS

| | | | | |
|---|---|---|---|---|
| 2021/0174743 | A1* | 6/2021 | Chang .................. | G09G 3/3258 |
| 2022/0093039 | A1* | 3/2022 | Tang .................... | G09G 3/2014 |

FOREIGN PATENT DOCUMENTS

| | | | |
|---|---|---|---|
| TW | 1675361 | B | 10/2019 |
| TW | I738435 | B | 9/2021 |
| TW | I841058 | B | 5/2024 |

* cited by examiner

DRIVING METHOD OF PIXEL CIRCUIT

CROSS-REFERENCE TO RELATED APPLICATION

This application claims priority to Taiwan Application Serial Number 113117640, filed May 13, 2024, which is herein incorporated by reference in its entirety.

BACKGROUND

Technical Field

The present disclosure relates to a driving method of a pixel circuit, and particularly relates to a driving method of a pixel circuit for mitigating flicker phenomena in display images at low refresh rate.

Description of Related Art

To reduce the power consumption of a wearable organic light-emitting diode (OLED) display to prolong the single-use duration for users, the pixel circuit of the wearable OLED display is operated at a low refresh rate (e.g., 5 Hz). However, a current (i.e., $I_{OLED}$) of a light-emitting element (i.e., OLED) of the pixel circuit varies due to leakage current and hysteresis effects of transistors of the pixel circuit being operated at the low refresh rate, resulting in a gradual variation in the brightness of an OLED display panel over time, thereby causing flicker phenomena in display images and degrading the display image quality.

SUMMARY

At least one embodiment of the present disclosure provides a driving method of a pixel circuit. The driving method includes: providing a preset light-emission control signal to the pixel circuit, wherein the pixel circuit includes a light-emitting element; measuring the light-emitting element while the light-emitting element emits light according to the preset light-emission control signal, thereby obtaining an initial instantaneous brightness waveform of the light-emitting element; modulating a number of plural pulse signals included in each display frame of the preset light-emission control signal and a pulse width of each of the pulse signals according to the initial instantaneous brightness waveform, thereby generating a compensated light-emission control signal; and providing the compensated light-emission control signal to the pixel circuit. In response to the light-emitting element emitting light according to the compensated light-emission control signal, an instantaneous brightness waveform of the light-emitting element appears to converge in each display frame.

In at least one embodiment of the present disclosure, each display frame includes a refresh frame and at least one skip frame. Each of the refresh frame and the at least one skip frame in each display frame of the preset light-emission control signal includes one pulse signal. Each of the refresh frame and the at least one skip frame in each display frame of the compensated light-emission control signal includes at least two pulse signals. The pixel circuit is operated at a low refresh rate.

In at least one embodiment of the present disclosure, numbers of the at least two pulse signals respectively included in the refresh frame and the at least one skip frame in each display frame of the compensated light-emission control signal are identical to each other.

In at least one embodiment of the present disclosure, numbers of the at least two pulse signals respectively included in the refresh frame and the at least one skip frame in each display frame of the compensated light-emission control signal are not all the same.

In at least one embodiment of the present disclosure, pulse widths of the at least two pulse signals included in each of the refresh frame and the at least one skip frame in each display frame of the compensated light-emission control signal are identical to each other.

In at least one embodiment of the present disclosure, pulse widths of the at least two pulse signals included in each of the at least one skip frame in each display frame of the compensated light-emission control signal are different from each other.

In at least one embodiment of the present disclosure, the at least two pulse signals included in each of the at least one skip frame in each display frame of the compensated light-emission control signal include a preceding pulse signal and a succeeding pulse signal later than the preceding pulse signal, and a pulse width of the preceding pulse signal is greater than a pulse width of the succeeding pulse signal.

In at least one embodiment of the present disclosure, the at least two pulse signals included in each of the at least one skip frame in each display frame of the compensated light-emission control signal include a preceding pulse signal and a succeeding pulse signal later than the preceding pulse signal, and a pulse width of the preceding pulse signal is less than a pulse width of the succeeding pulse signal.

In at least one embodiment of the present disclosure, each display frame includes at least three skip frames, and a pulse width of a j-th pulse signal of the at least two pulse signals included in an i-th skip frame of the at least three skip frames is greater than a pulse width of a j-th pulse signal of the at least two pulse signals included in an (i+2)-th skip frame of the at least three skip frames, in which i and j are natural numbers.

In at least one embodiment of the present disclosure, each display frame includes at least three skip frames, and a pulse width of a j-th pulse signal of the at least two pulse signals included in an i-th skip frame of the at least three skip frames is less than a pulse width of a j-th pulse signal of the at least two pulse signals included in an (i+2)-th skip frame of the at least three skip frames, in which i and j are natural numbers.

At least one embodiment of the present disclosure further provides a driving method of a pixel circuit. The driving method includes: providing a preset light-emission control signal to the pixel circuit, wherein the pixel circuit includes a light-emitting element; measuring the light-emitting element while the light-emitting element emits light according to the preset light-emission control signal, thereby obtaining an initial instantaneous brightness waveform of the light-emitting element; modulating a number of plural pulse signals included in each display frame of the preset light-emission control signal and a pulse width of each of the pulse signals according to the initial instantaneous brightness waveform, thereby generating a compensated light-emission control signal; and providing the compensated light-emission control signal to the pixel circuit. Each display frame includes a refresh frame and at least one skip frame. Each of the refresh frame and the at least one skip frame in each display frame of the preset light-emission control signal includes one pulse signal. Each of the refresh frame and the at least one skip frame in each display frame of the compensated light-emission control signal includes at least two pulse signals.

In at least one embodiment of the present disclosure, in response to the light-emitting element emitting light according to the compensated light-emission control signal, an instantaneous brightness waveform of the light-emitting element appears to converge in each display frame. The pixel circuit is operated at a low refresh rate.

To make the above features and advantages of the present disclosure more clearly understood, specific embodiments are exemplified below and described in detail with reference to the accompanying drawings.

BRIEF DESCRIPTION OF THE DRAWINGS

A better understanding of the aspects of the present disclosure may be obtained from the following detailed description made with reference to the accompanying drawings. It should be noted that, in accordance with standard practices in the industry, the features are not drawn to scale. In fact, the dimensions of the features may be arbitrarily increased or decreased for clarity of discussion.

DETAILED DESCRIPTION

Embodiments of the present disclosure are discussed in detail below. However, it is understandable that the embodiments provide many applicable concepts that can be implemented in a wide variety of specific contexts. The embodiments discussed and disclosed are provided for illustrative purposes only and are not intended to limit the scope of the present disclosure. Regarding the terms "first", "second", . . . used herein, they do not specifically indicate order or sequence, but are merely used to distinguish elements or operations described with the same technical terms.

Figure 1:
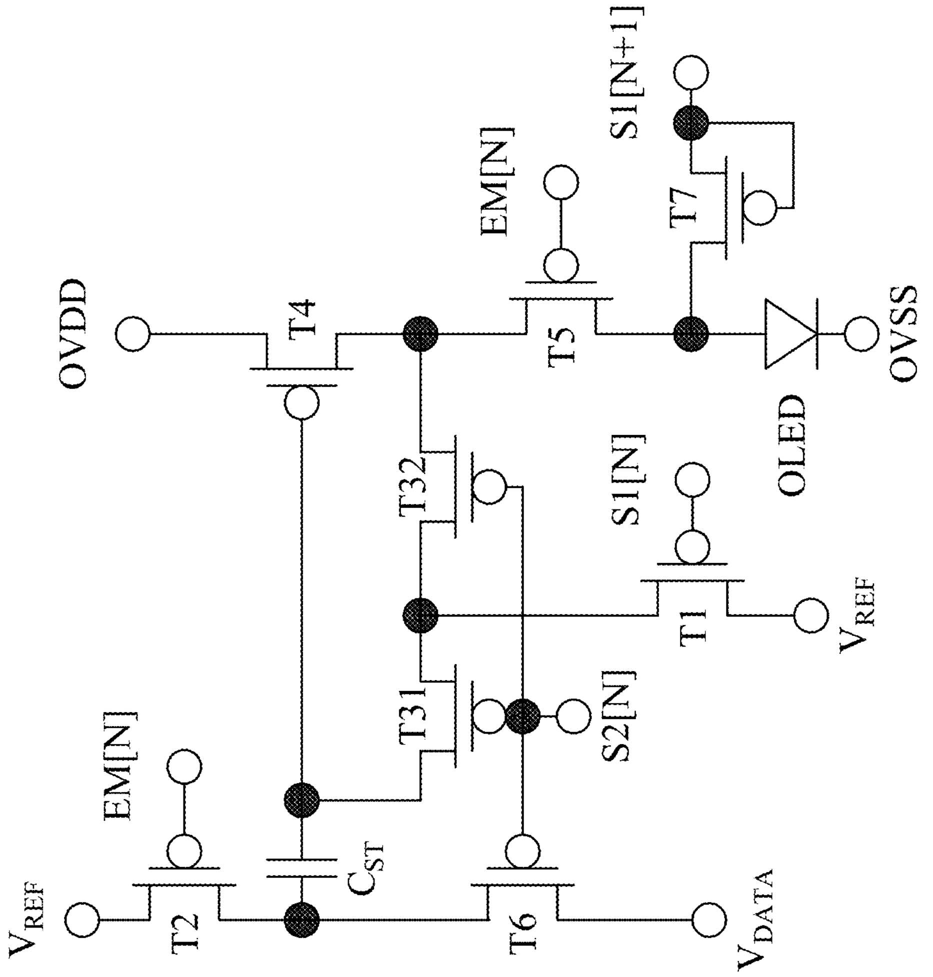
FIG. 1 is a schematic diagram of a pixel circuit according to some embodiments of the present disclosure.

FIG. 1 is a schematic diagram of a pixel circuit according to some embodiments of the present disclosure. Specifically, the pixel circuit as shown in FIG. 1 is applicable to an organic light-emitting diode (OLED) display and includes transistors T1, T2, T31, T32, T4, T5, T6, T7, a capacitor $C_{ST}$, and a light-emitting element OLED.

The transistors T4, T5, and the light-emitting element OLED constitute a light-emitting circuit of the pixel circuit. A gate electrode of the transistor T4 receives a data signal $V_{DATA}$. A gate electrode of the transistor T5 receives a light-emission control signal EM[N]. The light-emitting element OLED is coupled in series with the transistors T4 and T5, and the light-emitting element OLED and the transistors T4 and T5 are coupled between two terminals respectively corresponding to the system voltages OVDD and OVSS to form a current path.

The transistors T1, T2, T31, T32, T6, T7, and the capacitor $C_{ST}$ constitute a control and compensation circuit of the pixel circuit. A gate electrode of the transistor T1 receives a scan signal S1[N]. A gate electrode of the transistor T2 receives the light-emission control signal EM[N]. A gate electrode of each of the transistors T31, T32, and T6 receives a scan signal S2[N]. A gate electrode of the transistor T7 receives a scan signal S1[N+1].

During a reset state of the pixel circuit, the scan signal S1[N] is controlled to turn on the transistor T1, so that one terminal of the transistor T1 is reset by a reference voltage $V_{REF}$ received at the other terminal of the transistor T1. Simultaneously, the scan signal S1[N+1] is controlled to turn on the transistor T7 to reset a voltage at an anode terminal of the light-emitting element OLED.

During a compensation state of the pixel circuit, the scan signal S1[N] is controlled to turn off the transistor T1. Simultaneously, the scan signal S2[N] is controlled to turn on the transistors T31, T32, and T6, so that one terminal of the capacitor $C_{ST}$ coupled to the transistor T6 receives a data voltage Vdata. Accordingly, the transistors T31 and T32 form a charging path, so that the other terminal of the capacitor $C_{ST}$ coupled to the transistor T31 is charged to achieve a difference between the system voltage OVDD and a threshold voltage (Vth) of the transistor T4. Thus, the capacitor $C_{ST}$ stores the threshold voltage of the transistor T4. In other words, compensation can be performed for the threshold voltage of the transistor T4 during the compensation state of the pixel circuit.

During a light emission state of the pixel circuit, the light-emission control signal EM[N] is controlled to turn on the transistors T2 and T5, so that a voltage at one terminal of the capacitor $C_{ST}$ coupled to the transistor T2 transitions from the data voltage Vdata to the reference voltage $V_{REF}$. This voltage transition is coupled by the capacitor $C_{ST}$ to the other terminal of the capacitor $C_{ST}$ coupled to the transistor T4. On the other hand, since both the transistors T4 and T5 are turned on, the light-emitting circuit of the pixel circuit may generate a conducting current flowing through the light-emitting element OLED to cause the light-emitting element OLED to emit light.

Figure 2:
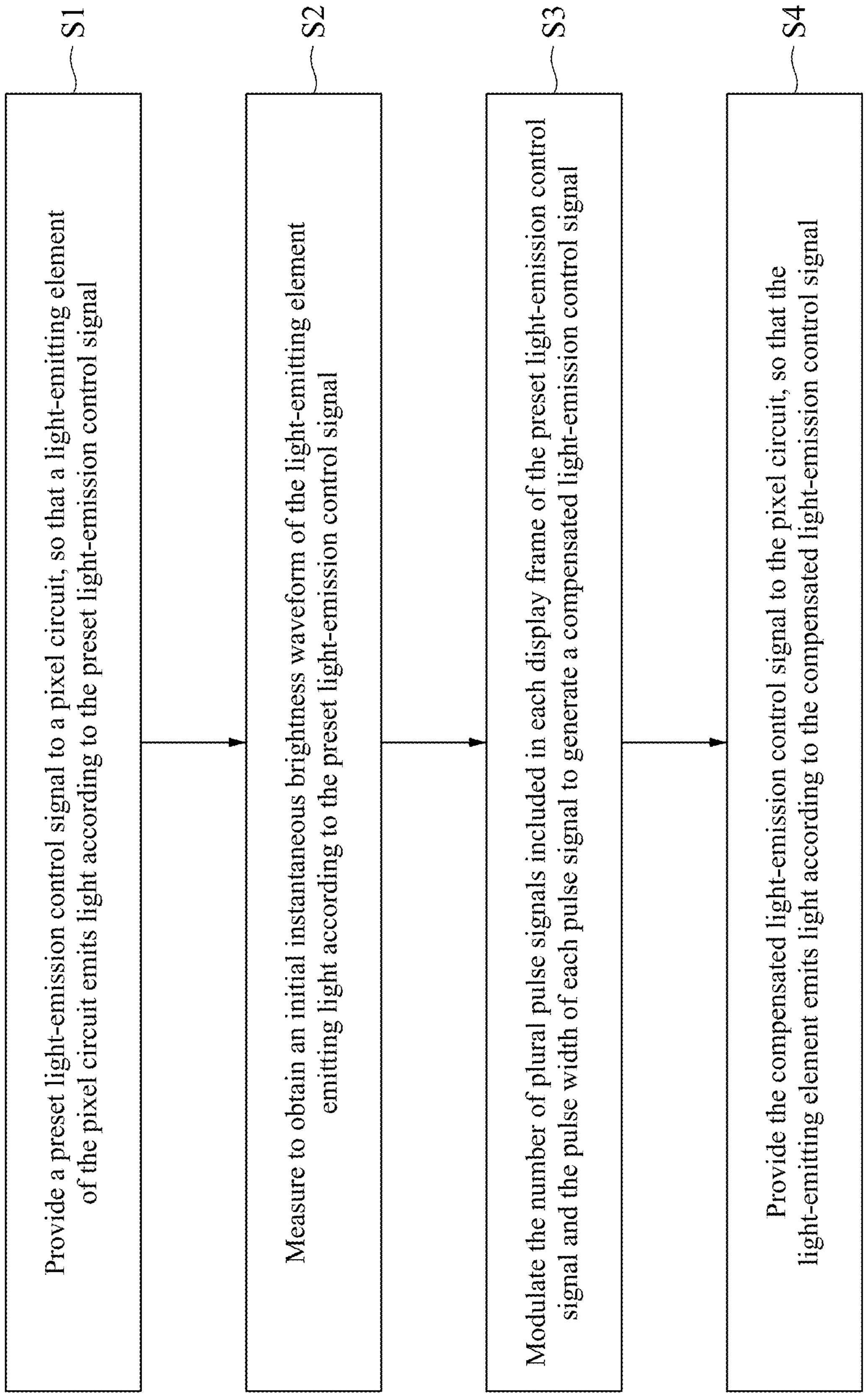
FIG. 2 is a flowchart of a driving method of the pixel circuit according to some embodiments of the present disclosure.

FIG. 2 is a flowchart of a driving method of the pixel circuit according to some embodiments of the present disclosure. The driving method as shown in FIG. 2 is applicable to the pixel circuit shown in FIG. 1. However, it is noteworthy that the circuit configuration of the pixel circuit in FIG. 1 is merely illustrative, and the present disclosure is not limited thereto, and other known pixel circuits applicable to OLED displays may also utilize the driving method as shown in FIG. 2.

As shown in FIG. 2, in Step S1, a preset light-emission control signal is provided to the pixel circuit as the light-emission control signal EM[N] for the pixel circuit as shown in FIG. 1, so that the light-emitting element (e.g., the light-emitting element OLED of the pixel circuit as shown in FIG. 1) emits light according to the preset light-emission control signal. In some embodiments of the present disclosure, the preset light-emission control signal includes one refresh frame and at least one skip frame in each display frame, and the preset light-emission control signal includes one pulse signal in each of one refresh frame and the at least one skip frame in each display frame. In some embodiments of the present disclosure, the pixel circuit is operated at a low refresh rate, that is, the preset light-emission control signal corresponds to the low refresh rate, such as 5 Hz, 10 Hz, 15 Hz, etc. It is noteworthy that the low refresh rate corresponding to the preset light-emission control signal and the pulse width of the pulse signal in the present disclosure are determined based on the requirements of a display product.

Figure 3:
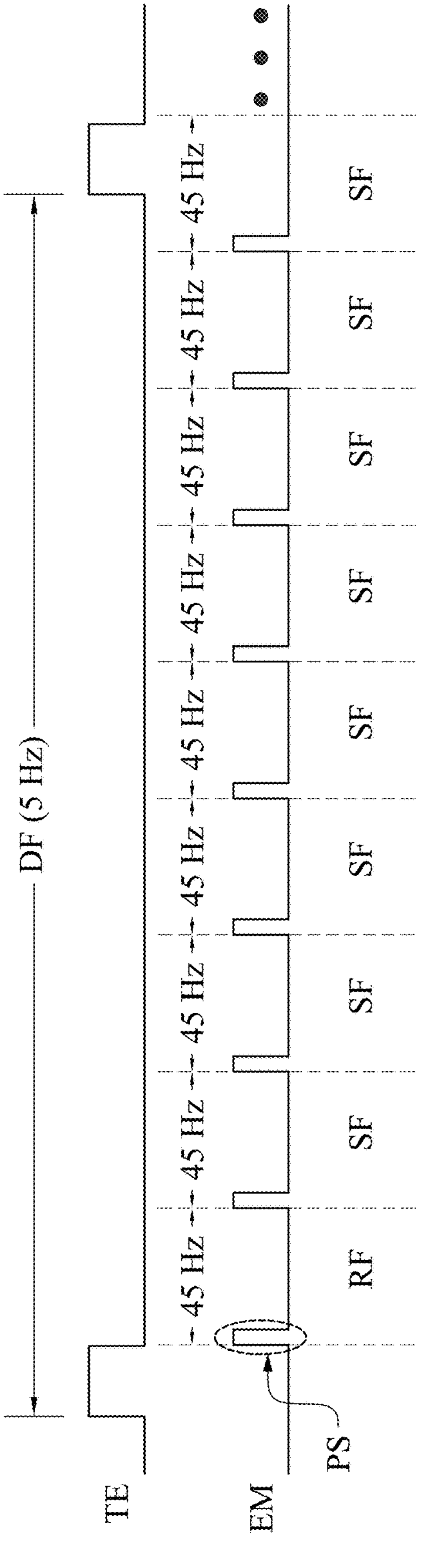
FIG. 3 is an exemplary schematic diagram of a preset light-emission control signal according to some embodiments of the present disclosure.

FIG. 3 is an exemplary schematic diagram of the preset light-emission control signal EM according to some embodiments of the present disclosure. The preset light-emission control signal EM as shown in FIG. 3 includes one refresh frame RF and eight skip frames SF in each display frame DF, and the preset light-emission control signal EM as shown in FIG. 3 includes one pulse signal PS in each of one refresh frame RF and eight skip frames SF included in each display frame DF. Specifically, the preset light-emission control signal EM as shown in FIG. 3 corresponds to the low refresh rate and a frame rate of each display frame DF is 5 Hz, while a frame rate of each of one refresh frame RF and eight skip frames SF included in each display frame DF is 45 Hz. However, it should be noted that the number of the skip frame SF, the frame rate of the display frame DF, and the frame rates of the refresh frame RF and the skip frames SF as shown in FIG. 3 are merely illustrative, and the present disclosure is not limited thereto.

Additionally, FIG. 3 also shows a TE (Tearing Effect) signal TE, which is a trigger signal carried by a display panel control circuit and indicates that the frame rate of each display frame DF is 5 Hz.

Returning to FIG. 2, in Step S2, when the light-emitting element emits light according to the preset light-emission control signal, the light-emitting element is measured to obtain an initial instantaneous brightness waveform of the light-emitting element. In some embodiments of the present disclosure, the initial instantaneous brightness waveform in step S2 is obtained by measurement using a display color analyzer. It is noteworthy that, in some embodiments of the present disclosure, the initial instantaneous brightness waveform of the light-emitting element refers to a brightness waveform obtained by measuring the light-emitting element with the display color analyzer when the light-emitting element emits light according to the preset light-emission control signal.

Figure 4:
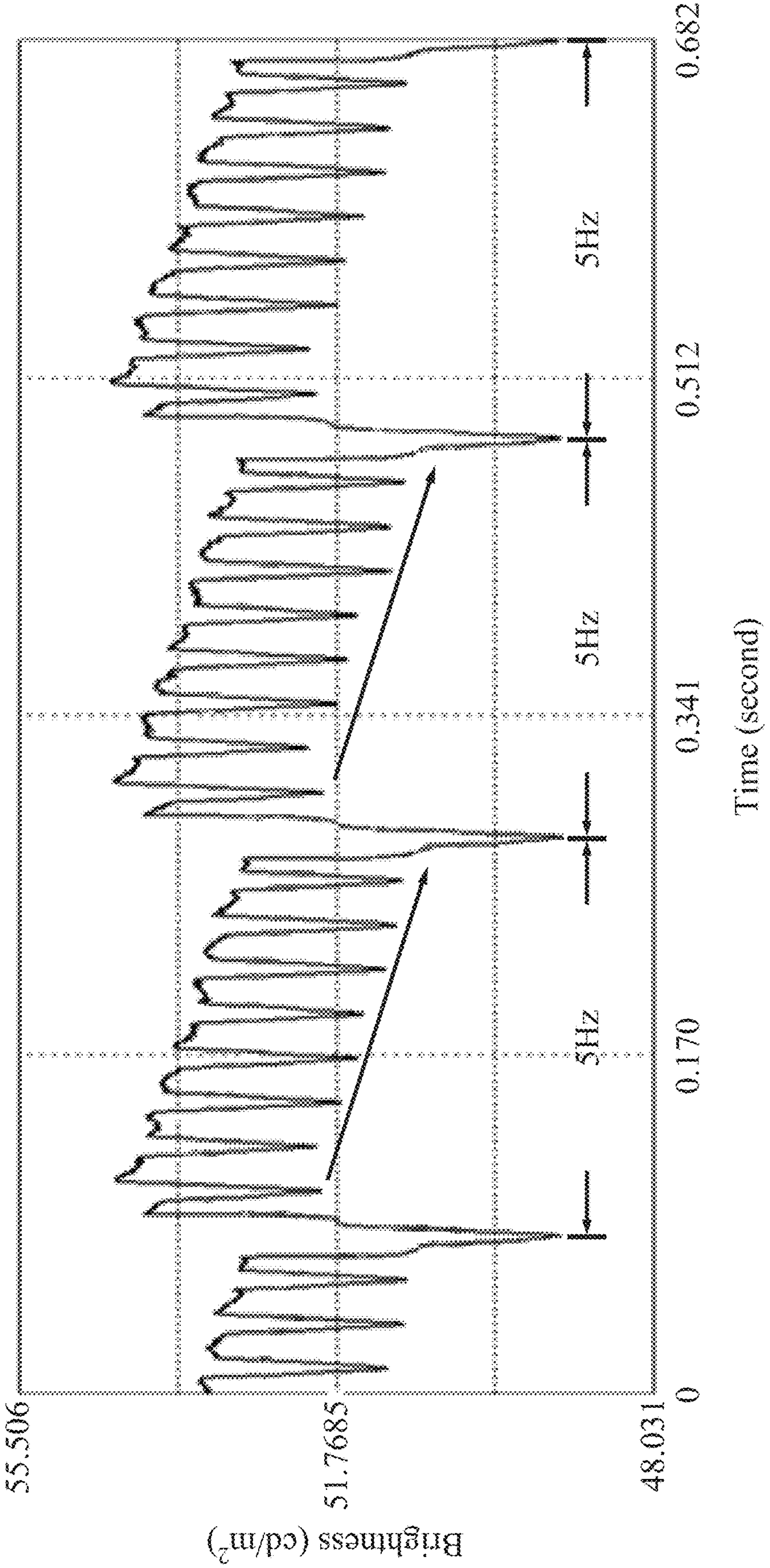
FIG. 4 is an exemplary schematic diagram of an initial instantaneous brightness waveform of a light-emitting element of the pixel circuit emitting light according to the preset light-emission control signal, according to some embodiments of the present disclosure.

FIG. 4 is an exemplary schematic diagram of the initial instantaneous brightness waveform of the light-emitting element of the pixel circuit emitting light according to the preset light-emission control signal, according to some embodiments of the present disclosure. As shown in FIG. 4, since the pixel circuit is operated at the low refresh rate (e.g., the preset light-emission control signal EM as shown in FIG. 3 has the frame rate of 5 Hz in each display frame DF), a current of the light-emitting element of the pixel circuit varies due to leakage current and hysteresis effects of transistors of the pixel circuit, resulting in a gradual variation in the brightness of a display panel over time (e.g., as indicated by the diagonal arrows in FIG. 4, which shows that the brightness of the display panel gradually decreases over time), thereby causing flicker phenomena in display images and degrading the display image quality. Furthermore, a flicker level of the initial instantaneous brightness waveform as shown in FIG. 4 is −40.59 dB, and the resulting image exhibits flicker phenomena at the low refresh rate, resulting in degraded image quality. Accordingly, the present disclosure proposes the driving method of the pixel circuit to mitigate flicker phenomena in display images operating at low refresh rates, thereby enhancing the display quality.

Returning to FIG. 2, in Step S3, according to the initial instantaneous brightness waveform, the number of plural pulse signals included in each display frame of the preset light-emission control signal and the pulse width of each of the pulse signals are modulated to generate a compensated light-emission control signal. In some embodiments of the present disclosure, the compensated light-emission control signal includes one refresh frame and at least one skip frame in each display frame, and the compensated light-emission control signal includes at least two pulse signals in each of the refresh frame and the at least one skip frame of each display frame. In some embodiments of the present disclosure, the pixel circuit is operated at the low refresh rate, that is, the compensated light-emission control signal corresponds to the low refresh rate.

Specifically, the modulation manner for the preset light-emission control signal in Step S3 first increases the number of the pulse signal included in each of one refresh frame and the at least one skip frame in each display frame from one to at least two, i.e., increases the frequency of the light-emission control signal in one refresh frame and the at least one skip frame included in each display frame. Subsequently, modifications to the pulse width of the pulse signal are determined based on the brightness magnitude at corresponding time points in the initial instantaneous brightness waveform obtained in Step S2. If the brightness is relatively low, the pulse width of the pulse signal at the corresponding time point is narrowed to increase the brightness; and if the brightness is relatively high, the pulse width of the pulse signal at the corresponding time point is widened to reduce the brightness.

Figure 5:
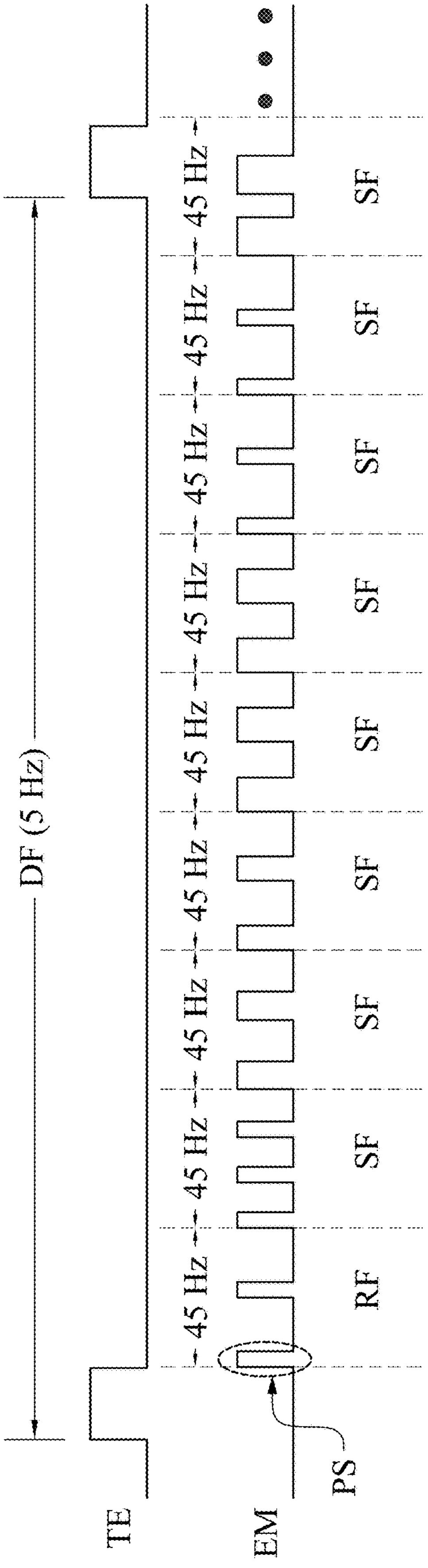
FIG. 5 is an exemplary schematic diagram of a compensated light-emission control signal according to a first embodiment of the present disclosure.

FIG. 5 is an exemplary schematic diagram of a compensated light-emission control signal EM according to a first embodiment of the present disclosure. The compensated light-emission control signal EM as shown in FIG. 5 includes one refresh frame RF and eight skip frames SF in each display frame DF, and the compensated light-emission control signal EM as shown in FIG. 5 includes at least two pulse signals PS in each of one refresh frame RF and eight skip frames SF included in each display frame DF. Specifically, the compensated light-emission control signal EM as shown in FIG. 5 corresponds to the low refresh rate and a frame rate of each display frame DF is 5 Hz, while a frame rate of each of one refresh frame RF and eight skip frames SF included in each display frame DF is 45 Hz. However, it should be noted that the number of the skip frame SF, the frame rate of the display frame DF, and the frame rates of the refresh frame RF and the skip frame SF as shown in FIG. 5 are merely illustrative, and the present disclosure is not limited thereto.

The numbers of the pulse signals PS respectively included in one refresh frame RF and eight skip frames SF in each display frame DF of the compensated light-emission control signal EM as shown in FIG. 5 are not all the same. As shown in FIG. 5, the number of the pulse signals PS included in a first skip frame SF is three, while the number of the pulse signals PS included in each of the remaining skip frames SF and the refresh frame RF is two. However, it should be noted that the numbers of the pulse signals respectively included in the refresh frame and the skip frames as shown in FIG. 5 is merely illustrative, and the present disclosure is not limited thereto.

The pulse widths of the at least two pulse signals PS included in each of one refresh frame RF and eight skip frames SF in each display frame DF of the compensated light-emission control signal EM as shown in FIG. 5 are identical to each other. Additionally, the pulse widths of the at least two pulse signals PS respectively included in one refresh frame RF and eight skip frames SF in each display frame DF of the compensated light-emission control signal EM as shown in FIG. 5 are not all the same.

Figure 6:
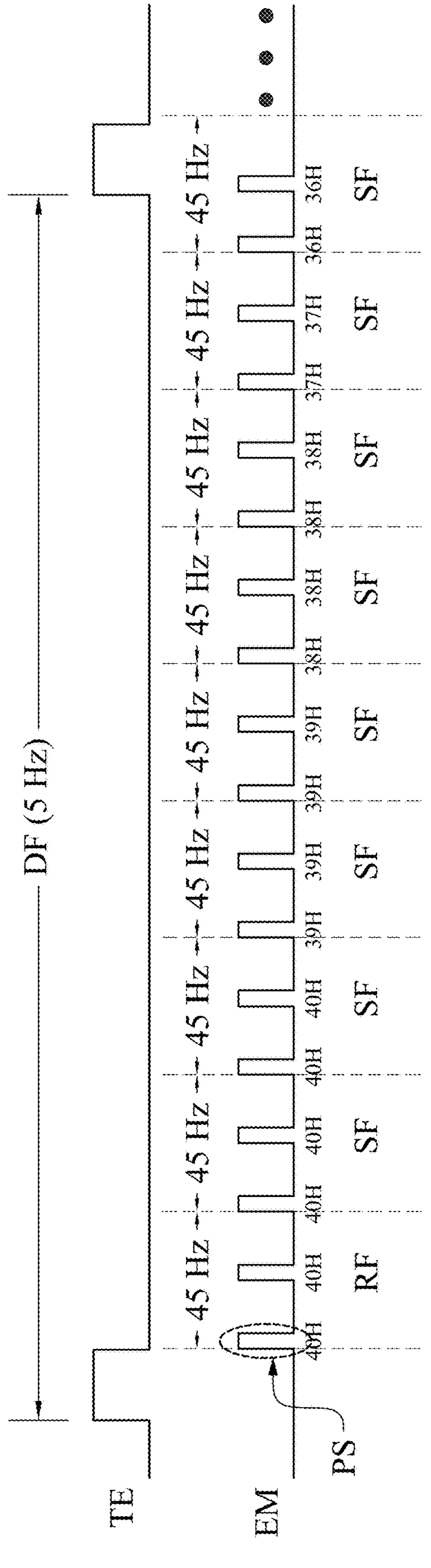
FIG. 6 is an exemplary schematic diagram of a compensated light-emission control signal according to a second embodiment of the present disclosure.

FIG. 6 is an exemplary schematic diagram of a compensated light-emission control signal EM according to a second embodiment of the present disclosure. The compensated light-emission control signal EM as shown in FIG. 6 includes one refresh frame RF and eight skip frames SF in each display frame DF, and the compensated light-emission control signal EM as shown in FIG. 6 includes two pulse signals PS in each of one refresh frame RF and eight skip frames SF included in each display frame DF. Specifically, the compensated light-emission control signal EM as shown in FIG. 6 corresponds to the low refresh rate and a frame rate of each display frame DF is 5 Hz, while a frame rate of each of one refresh frame RF and eight skip frames SF included in each display frame DF is 45 Hz. However, it should be noted that the number of the skip frame SF, the frame rate of the display frame DF, and the frame rates of the refresh frame RF and the skip frame SF as shown in FIG. 6 are merely illustrative, and the present disclosure is not limited thereto.

The number of the pulse signals PS respectively included in one refresh frame RF and eight skip frames SF in each display frame DF of the compensated light-emission control signal EM as shown in FIG. 6 are identical to each other. As shown in FIG. 6, the number of the pulse signal PS included in each of one refresh frame RF and eight skip frames SF in each display frame DF of the compensated light-emission control signal EM is two. In other words, the frequency of the compensated light-emission control signal EM is consistent (e.g., 90 Hz) in each of one refresh frame RF and eight skip frames SF in each display frame DF. However, it should be noted that the number of the pulse signal PS included in each of the refresh frame RF and the skip frames SF as in FIG. 6 is merely illustrative, and the present disclosure is not limited thereto.

FIG. 6 further illustrates the pulse width of each pulse signal PS, which corresponds to a line time allocated to a column of pixels. For example, two pulse signals PS included in one refresh frame RF in each display frame DF of the compensated light-emission control signal EM as shown in FIG. 6 each have a pulse width of 40 line times (40H). For example, two pulse signals PS included in the last skip frame SF in each display frame DF of the compensated light-emission control signal EM as shown in FIG. 6 each have a pulse width of 36 line times (36H).

Accordingly, as can be seen from FIG. 6, the pulse widths of two pulse signals PS included in each of one refresh frame RF and eight skip frames SF in each display frame DF of the compensated light-emission control signal EM are identical to each other. As shown in FIG. 6, the pulse widths of two pulse signals PS included in each of the refresh frame RF, a first skip frame SF, and a second skip frame are all 40H. The pulse widths of two pulse signals PS included in each of a third skip frame SF and a fourth skip frame are all 39H. The pulse widths of two pulse signals PS included in each of a fifth skip frame SF and a sixth skip frame are all 38H. The pulse widths of two pulse signals PS included in a seventh skip frame SF are all 37H. The pulse widths of two pulse signals PS included in each of the last skip frame SF are all 36H. Additionally, the pulse widths of two pulse signals PS included in one refresh frame RF and eight skip frames SF in each display frame DF of the compensated light-emission control signal EM as shown in FIG. 6 are not all the same. For example, as shown in FIG. 6, the pulse widths of two pulse signals PS included in each included in one refresh frame RF and eight skip frames SF may be 40H, 39H, 38H, 37H, or 36H.

In the embodiments of the present disclosure (e.g., the second embodiment of FIG. 6 and the third embodiment of FIG. 8), each display frame includes at least three skip frames, where the pulse width of a j-th pulse signal of the at least two pulse signals included in an i-th skip frame of the at least three skip frames is greater than the pulse width of a j-th pulse signal of the at least two pulse signals included in an (i+2)-th skip frame of the at least three skip frames, where i and j are natural numbers.

For example, the compensated light-emission control signal EM as shown in FIG. 6 includes eight skip frames SF in each display frame DF. The pulse width (i.e., 40H) of a first pulse signal of two pulse signals included in a first skip frame SF of eight skip frames SF is greater than the pulse width (i.e., 39H) of a first pulse signal of two pulse signals included in a third skip frame SF of eight skip frames SF. For example, the pulse width (i.e., 38H) of a second pulse signal of two pulse signals included in a sixth skip frame SF of eight skip frames SF is greater than the pulse width (i.e., 36H) of a second pulse signal of two pulse signals included in an eighth skip frame SF of eight skip frames SF.

In other words, in the embodiments of the present disclosure (e.g., the second embodiment of FIG. 6 and the third embodiment of FIG. 8), the pulse widths of the pulse signals included in one refresh frame RF and eight skip frames SF in each display frame DF of the compensated light-emission control signal EM exhibit a progressive variation (e.g., a progressive decrease as shown in FIG. 6). It should be noted, however, that the above progressive variation may alternatively be a progressive increase. Specifically, whether the progressive variation is a progressive decrease or progressive increase depends on the initial instantaneous brightness waveform obtained in Step S2. For example, if the initial instantaneous brightness waveform obtained in Step S2 exhibits a time-dependent brightness decrease as shown in FIG. 4, the progressive variation is a progressive decrease to compensate for a phenomenon that the brightness decreases progressively over time; conversely, if the initial instantaneous brightness waveform exhibits a time-dependent brightness increase, the progressive variation is a progressive increase.

Specifically, when the progressive variation is the progressive increase, each display frame includes at least three skip frames, and the pulse width of a j-th pulse signal of the at least two pulse signals included in an i-th skip frame of the at least three skip frames is less than the pulse width of a j-th pulse signal of the at least two pulse signals included in an (i+2)-th skip frame of the at least three skip frames, where i and j are natural numbers.

Returning to FIG. 2, in Step S4, the compensated light-emission control signal is provided to the pixel circuit (to serve as the light-emission control signal EM[N] of the pixel circuit as shown in FIG. 1), so that the light-emitting element (e.g., the OLED of the pixel circuit as shown in FIG. 1) emits light according to the compensated light-emission control signal. When the light-emitting element emits light according to the compensated light-emission control signal, an instantaneous brightness waveform of the light-emitting element appears to converge in each display frame. It is noteworthy that, in the embodiments of the present disclosure, the instantaneous brightness waveform of the light-emitting element refers to a brightness waveform obtained by measuring the light-emitting element with the display color analyzer when the light-emitting element emits light according to the compensated light-emission control signal.

Figure 7:
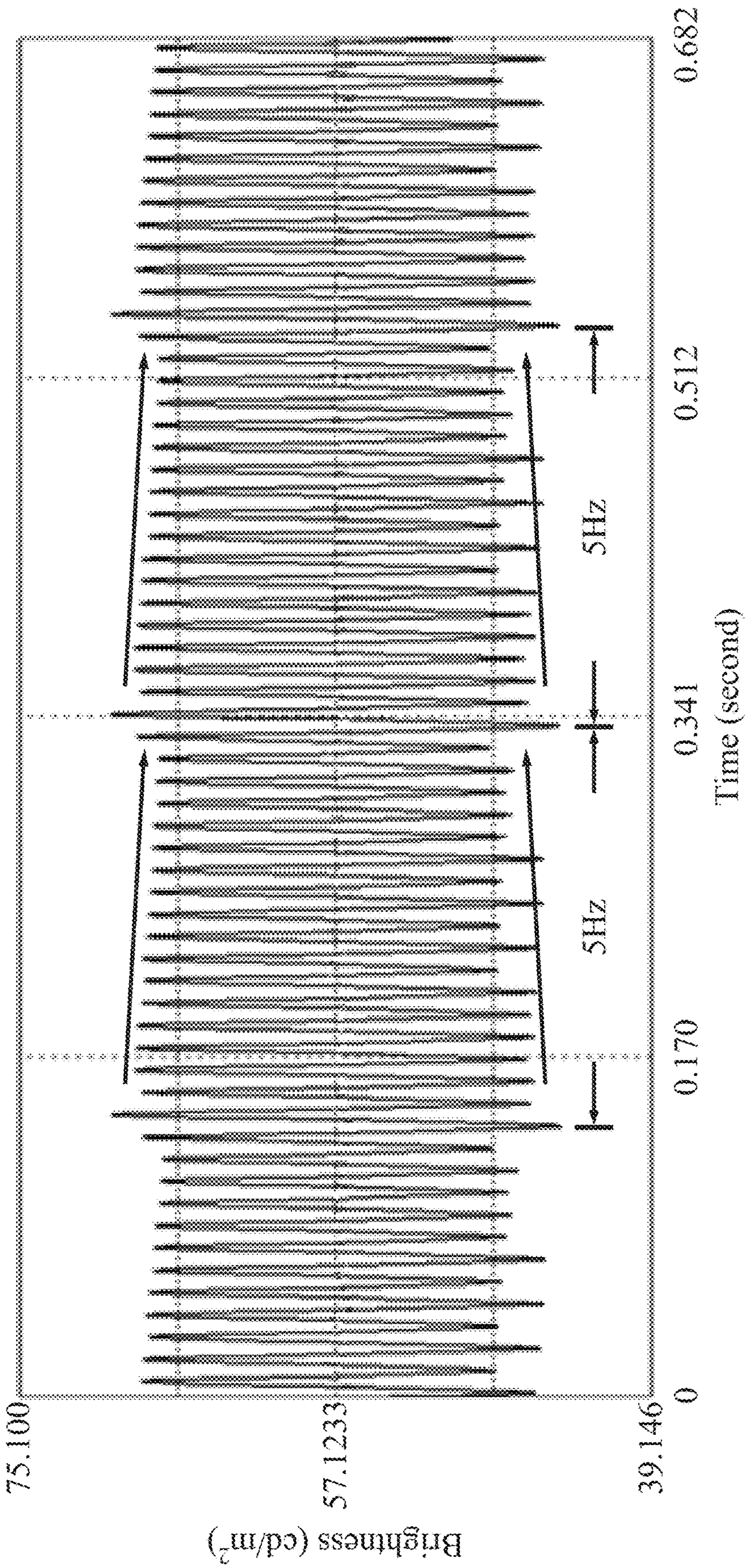
FIG. 7 is an exemplary schematic diagram of an instantaneous brightness waveform of a light-emitting element of a pixel circuit emitting light according to the compensated light-emission control signal as shown in FIG. 6, according to the second embodiment of the present disclosure.

FIG. 7 is an exemplary schematic diagram of the instantaneous brightness waveform of the light-emitting element of the pixel circuit emitting light according to the compensated light-emission control signal EM as shown in FIG. 6, according to a second embodiment of the present disclosure. As shown in FIG. 7, the instantaneous brightness waveform of the light-emitting element emitting light in the pixel circuit appears to converge in each display frame (as indicated by the diagonal arrow in FIG. 7, which shows that the bright-state brightness and dark-state brightness of the display panel exhibit temporal convergence within each display frame), thereby mitigating flicker phenomena in display images and enhancing the display quality. Furthermore, the flicker level of the instantaneous brightness waveform as shown in FIG. 7 is −66.01 dB, and the resulting image remains stable at the low refresh rate with no noticeable flicker sensation. Accordingly, the driving method of the pixel circuit proposed in the present disclosure can indeed mitigate flicker phenomena in display images operating at low refresh rates, thereby enhancing the display quality.

Figure 8:
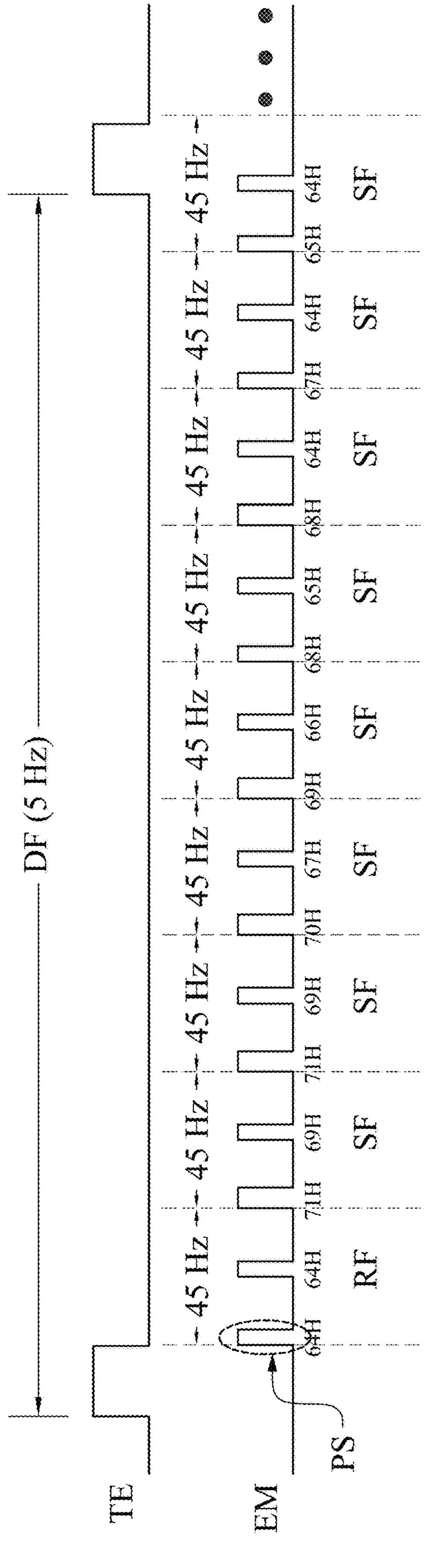
FIG. 8 is an exemplary schematic diagram of a compensated light-emission control signal according to a third embodiment of the present disclosure.

FIG. 8 is an exemplary schematic diagram of a compensated light-emission control signal EM according to a third embodiment of the present disclosure. The compensated light-emission control signal EM as shown in FIG. 8 includes one refresh frame RF and eight skip frames SF in each display frame DF, and the compensated light-emission control signal EM as shown in FIG. 8 includes two pulse signals PS in each of one refresh frame RF and eight skip frames SF included in each display frame DF. Specifically, the compensated light-emission control signal EM as shown in FIG. 8 corresponds to the low refresh rate and a frame rate of each display frame DF is 5 Hz, while a frame rate of each of one refresh frame RF and eight skip frames SF included in each display frame DF is 45 Hz. However, it should be noted that the number of the skip frame SF, the frame rate of the display frame DF, and the frame rates of the refresh frame RF and the skip frame SF as shown in FIG. 8 are merely illustrative, and the present disclosure is not limited thereto.

The numbers of the pulse signals PS respectively included in one refresh frame RF and eight skip frames SF in each display frame DF of the compensated light-emission control signal EM as shown in FIG. 8 are identical to each other. As shown in FIG. 8, the number of the pulse signals PS included in each of one refresh frame RF and eight skip frames SF in each display frame DF of the compensated light-emission control signal EM is two. In other words, the frequency of the compensated light-emission control signal EM is consistent (e.g., 90 Hz) in each of one refresh frame RF and eight skip frames SF in each display frame DF. However, it should be noted that the number of the pulse signals included in each of the refresh frame and the skip frames as shown in FIG. 8 is merely illustrative, and the present disclosure is not limited thereto.

FIG. 8 further illustrates the pulse width of each pulse signal PS. For example, the pulse widths of two pulse signals PS included in one refresh frame RF in each display frame DF of the compensated light-emission control signal EM as shown in FIG. 8 are both 64 line times (64H). For example, the pulse widths of two pulse signals PS included in the last skip frame SF in each display frame DF of the compensated light-emission control signal EM as shown in FIG. 8 are 65 line times (65H) and 64 line times (64H), respectively.

Accordingly, as can be seen from FIG. 8, the pulse widths of two pulse signals PS included in each of eight skip frames SF in each display frame DF of the compensated light-emission control signal EM are different from each other. For example, as shown in FIG. 8, the pulse widths of two pulse signals PS included in each of a first skip frames SF and a second skip frame SF are 71H and 69H. For example, as shown in FIG. 8, the pulse widths of two pulse signals PS included in a third skip frames SF are 70H and 67H. For example, as shown in FIG. 8, the pulse widths of two pulse signals PS included in a fourth skip frames SF are 69H and 66H. For example, as shown in FIG. 8, the pulse widths of two pulse signals PS included in a fifth skip frames SF are 68H and 65H. For example, as shown in FIG. 8, the pulse widths of two pulse signals PS included in a sixth skip frames SF are 68H and 64H. For example, as shown in FIG. 8, the pulse widths of two pulse signals PS included in a seventh skip frames SF are 67H and 64H. For example, as shown in FIG. 8, the pulse widths of two pulse signals PS included in the last skip frames SF are 65H and 64H. Furthermore, the pulse widths of two pulse signals PS included in one refresh frame RF and eight skip frames SF in each display frame DF of the compensated light-emission control signal EM as shown in FIG. 8 are not all the same. For example, as shown in FIG. 8, the pulse widths of two pulse signals PS included in each included in one refresh frame RF and eight skip frames SF may be 71H, 70H, 69H, 68H, 67H, 66H, 65H, or 64H.

The compensated light-emission control signal EM as shown in FIG. 8 includes eight skip frames SF in each display frame DF. The pulse width (i.e., 69H) of a second pulse signal of two pulse signals included in a first skip frame SF is greater than the pulse width (i.e., 67H) of a second pulse signal of two pulse signals included in a third skip frame SF. For example, the pulse width (i.e., 68H) of a first pulse signal of two pulse signals included in a sixth skip frame SF is greater than the pulse width (i.e., 65H) of a first pulse signal of two pulse signals included in an eighth skip frame SF.

In other words, the pulse widths of the pulse signals included in one refresh frame RF and eight skip frames SF in each display frame DF of the compensated light-emission control signal EM exhibit a progressive variation (e.g., a progressive decrease as shown FIG. 8).

In the embodiments of the present disclosure (e.g., the third embodiment in FIG. 8), the at least two pulse signals included in each of the at least one skip frame in each display frame of the compensated light-emission control signal EM include a preceding pulse signal and a succeeding pulse signal later than the preceding pulse signal, where the pulse width of the preceding pulse signal is greater than that of the succeeding pulse signal.

For example, the compensated light-emission control signal EM as shown in FIG. 8 includes eight skip frames SF in each display frame DF, and in two pulse signals included in a first skip frame of eight skip frames SF, the pulse width (i.e., 71H) of the former one (i.e., the aforementioned preceding pulse signal) is greater than that (i.e., 69H) of the later one (i.e., the aforementioned succeeding pulse signal). For example, in two pulse signals included in a sixth skip frame of eight skip frames SF, the pulse width (i.e., 68H) of the former one is greater than that (i.e., 64H) of the later one.

In other words, in the embodiments of the present disclosure (e.g., the third embodiment of FIG. 8), the pulse widths of two pulse signals included in each of eight skip frames SF in each display frame DF of the compensated light-emission control signal EM exhibit a progressive variation (e.g., a progressive decrease as shown in FIG. 8). It should be noted, however, that the above progressive variation may alternatively be a progressive increase. Specifically, whether the progressive variation is a progressive decrease or progressive increase depends on the initial instantaneous brightness waveform obtained in Step S2. For example, if the initial instantaneous brightness waveform obtained in Step S2 exhibits a time-dependent brightness decrease as shown in FIG. 4, the progressive variation is a progressive decrease to compensate for a phenomenon that the brightness decreases progressively over time; conversely, if the initial instantaneous brightness waveform exhibits a time-dependent brightness increase, the progressive variation is a progressive increase.

Specifically, when the progressive variation is a progressive increase, the at least two pulse signals included in each of at least one skip frame in each display frame of the compensated light-emission control signal include a preceding pulse signal and a succeeding pulse signal later than the preceding pulse signal, in which the pulse width of the preceding pulse signal is less than the pulse width of the succeeding pulse signal.

In summary, the present disclosure proposes the driving method of the pixel circuit. By modulating the frequencies and pulse widths of the pulse signals in the refresh frames and the skip frames in each display frame of the light-emission control signal, flicker phenomena in display images operating at low refresh rates are mitigated, thereby enhancing the display quality.

The foregoing outlines features of several embodiments, enabling those skilled in the art to better understand the aspects of the present disclosure. Those skilled in the art should recognize that they may readily use the present disclosure as a basis to design or modify other processes and structures to achieve identical objectives and/or advantages as the embodiments described herein. Those skilled in the art should also understand that such equivalent constructions do not depart from the spirit and scope of the present disclosure, and that various changes, substitutions, and alterations may be made without departing from the spirit and scope of the present disclosure.

What is claimed is:

1. A driving method of a pixel circuit, comprising:

providing a preset light-emission control signal to the pixel circuit, wherein the pixel circuit comprises a light-emitting element;

measuring the light-emitting element while the light-emitting element emits light according to the preset light-emission control signal, thereby obtaining an initial instantaneous brightness waveform of the light-emitting element;

modulating a number of plural pulse signals included in each display frame of the preset light-emission control signal and a pulse width of each of the pulse signals according to the initial instantaneous brightness waveform, thereby generating a compensated light-emission control signal; and providing the compensated light-emission control signal to the pixel circuit, wherein in response to the light-emitting element emitting light according to the compensated light-emission control signal, an instantaneous brightness waveform of the light-emitting element appears to converge in each display frame;

wherein modifications to the pulse width of each of the pulse signals are determined based on a brightness magnitude at corresponding time points in the initial instantaneous brightness waveform.

2. The driving method according to claim 1, wherein each display frame comprises a refresh frame and at least one skip frame, wherein each of the refresh frame and the at least one skip frame in each display frame of the preset light-emission control signal comprises one pulse signal, wherein each of the refresh frame and the at least one skip frame in each display frame of the compensated light-emission control signal comprises at least two pulse signals, wherein the pixel circuit is operated at a low refresh rate.

3. The driving method according to claim 2, wherein numbers of the at least two pulse signals respectively included in the refresh frame and the at least one skip frame in each display frame of the compensated light-emission control signal are identical to each other.

4. The driving method according to claim 3, wherein pulse widths of the at least two pulse signals included in each of the at least one skip frame in each display frame of the compensated light-emission control signal are different from each other.

5. The driving method according to claim 3, wherein the at least two pulse signals included in each of the at least one skip frame in each display frame of the compensated light-emission control signal comprise a preceding pulse signal and a succeeding pulse signal later than the preceding pulse signal, wherein a pulse width of the preceding pulse signal is greater than a pulse width of the succeeding pulse signal.

6. The driving method according to claim 3, wherein the at least two pulse signals included in each of the at least one skip frame in each display frame of the compensated light-emission control signal comprise a preceding pulse signal and a succeeding pulse signal later than the preceding pulse signal, wherein a pulse width of the preceding pulse signal is less than a pulse width of the succeeding pulse signal.

7. The driving method according to claim 2, wherein numbers of the at least two pulse signals respectively included in the refresh frame and the at least one skip frame in each display frame of the compensated light-emission control signal are not all the same.

8. The driving method according to claim 7, wherein pulse widths of the at least two pulse signals included in each of the refresh frame and the at least one skip frame in each display frame of the compensated light-emission control signal are identical to each other.

9. The driving method according to claim 2, wherein each display frame comprises at least three skip frames, and a pulse width of a j-th pulse signal of the at least two pulse signals included in an i-th skip frame of the at least three skip frames is greater than a pulse width of a j-th pulse signal of the at least two pulse signals included in an (i+2)-th skip frame of the at least three skip frames, wherein i and j are natural numbers.

10. The driving method according to claim 2, wherein each display frame comprises at least three skip frames, and a pulse width of a j-th pulse signal of the at least two pulse signals included in an i-th skip frame of the at least three skip frames is less than a pulse width of a j-th pulse signal of the at least two pulse signals included in an (i+2)-th skip frame of the at least three skip frames, wherein i and j are natural numbers.

11. The driving method according to claim 2, further comprising:

increasing a frequency of the preset light-emission control signal in the refresh frame and the at least one skip frame included in each display frame to modulate the number of the pulse signals included in each display frame of the preset light-emission control signal.

12. The driving method according to claim 1, further comprising:

using a display color analyzer to measure the light-emitting element while the light-emitting element emits light according to the preset light-emission control signal.

13. A driving method of a pixel circuit, comprising:

providing a preset light-emission control signal to the pixel circuit, wherein the pixel circuit comprises a light-emitting element;

measuring the light-emitting element while the light-emitting element emits light according to the preset light-emission control signal, thereby obtaining an initial instantaneous brightness waveform of the light-emitting element;

modulating a number of plural pulse signals included in each display frame of the preset light-emission control signal and a pulse width of each of the pulse signals according to the initial instantaneous brightness waveform, thereby generating a compensated light-emission control signal; and providing the compensated light-emission control signal to the pixel circuit;

wherein each display frame comprises a refresh frame and at least one skip frame, wherein each of the refresh frame and the at least one skip frame in each display frame of the preset light-emission control signal comprises one pulse signal, wherein each of the refresh frame and the at least one skip frame in each display frame of the compensated light-emission control signal comprises at least two pulse signals.

14. The driving method according to claim 13, wherein in response to the light-emitting element emitting light according to the compensated light-emission control signal, an instantaneous brightness waveform of the light-emitting element appears to converge in each display frame, wherein the pixel circuit is operated at a low refresh rate.

* * * * *